March 2, 1971 G. W. KELLUM 3,566,453
SAFETY CATCH
Filed Nov. 19, 1968

INVENTOR
GEORGE W. KELLUM
BY
Barlow & Barlow
ATTORNEYS 3,566,453
SAFETY CATCH
George W. Kellum, Rehoboth, Mass., assignor to
General Findings, Inc.
Filed Nov. 19, 1968, Ser. No. 776,885
Int. Cl. A44b 9/10
U.S. Cl. 24—157          2 Claims

ABSTRACT OF THE DISCLOSURE

A safety catch for use with a pin-like stem having a fixed member and a keeper member rotatably mounted therein, which members in one relative position present aligned openings to receive the pin stem, the keeper member being of such construction that the pressing of the pin stem into the mouths of the aligned openings will cause a relative rotation of the keeper member so as to move it to a position to lock the pin stem in the catch.

BACKGROUND OF THE INVENTION

Safety catches have been arranged so that pressure of the pin stem on one part of the catch will move the locking part over the pin stem in arrangements where the movable part presents a lever-like action such as shown in Pat. 1,555,095. In some cases the rotary part is rotatable about a center axis within one of the slots, such as in the fixed part, extending to the axis of rotation with a slot in the other part extending to one side of the axis of rotation such as shown in Pat. 2,142,877. The arrangement of these safety catches is such that the locking member does not move completely to lock position by the action of the pin stem but must be manually moved for a completion of its desired locking position.

SUMMARY OF THE INVENTION

The safety catch of this invention has a channel in the fixed member which defines a path spaced from the axis of rotation of a rotary keeper member which is mounted therein, the channel extending substantially 180° of arc from the center of the axis of rotation of the keeper member thus permitting the rotary keeper, which has a slot therein, which in some positions will align with the channel in the fixed part, to be moved through a substantial arc about its axis of rotation to a locking position by action of the pin stem against a camming surface which is provided on the rotary keeper and further with a loosely mounted keeper it will move further by the momentum acquired to the full extent of its throw.

DESCRIPTION OF THE PREFERRED EMBODIMENT

Figure 1:
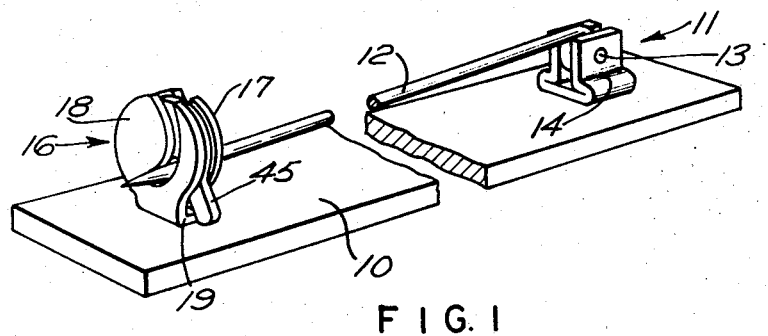
FIG. 1 is a perspective view showing a pin stem and the safety catch of this invention securing the same in position.

Referring more particularly to the drawing wherein like reference characters indicate like parts throughout the several views, the device embodying the invention is shown in FIG. 1 as applied to an ordinary bar type pin comprising a plate 10 having a hinge member 11 secured thereto by solder or other suitable means. The hinge member 11 has a pin stem 12 pivotally attached thereto as indicated at 13. The hinge member has an enlarged integral base formed, as shown in FIG. 1, by folding the metal from which the hinge is formed upon itself to provide protruding flanges 14. This provides a large bottom surface for connection with the plate 10.

Figure 2:
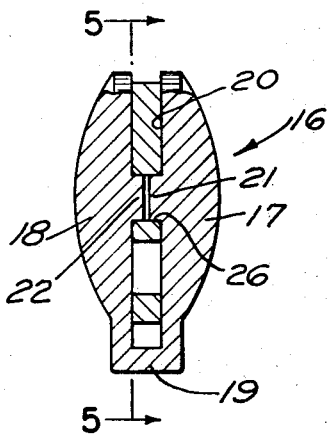
FIG. 2 is a central sectional view through the catch without the pin stem.

The catch embodying this invention comprises a fixed housing member 16 having arms 17 and 18 connected by a bridging portion 19 which may be soldered to the bar 10. As shown in the edge view (FIG. 2), this member is slotted as at 20 wtih trunnions 21 and 22 extending inwardly from the arms 17 and 18 toward each other for pivotally mounting a rotary keeper member therein.

The rotary keeper member is designated generally 25 and has an opening 26 with beveled entrance edges to receive the trunnions 21 and 22 from opposite sides as the arms 17 and 18 are bent into final position so as to rotatably pivotally mount this keeper between the arms 17 and 18. This pivot is undisturbed and not intersected by the openings in the members which receive the pin stem.

The opposite arms 17 and 18 of the housing member are provided with registering channels 30 of a size to receive the pin stem therein and guide it from its open mouth 31 to a position at 32 through an arc along its guiding surface 33 of more than 180° from the center or axis of the pivoting trunnions 21 and 22.

Figure 3:
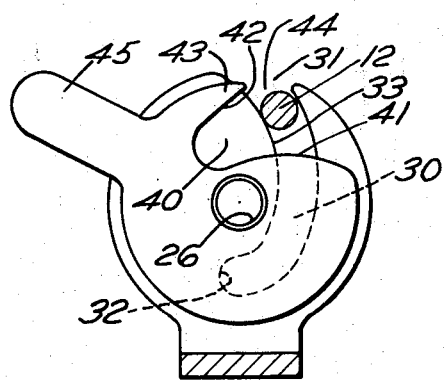
FIG. 3 is a sectional view showing the relative position of the keeper and the stationary part of the catch in a position for receiving the pin stem therein.
Figure 5:
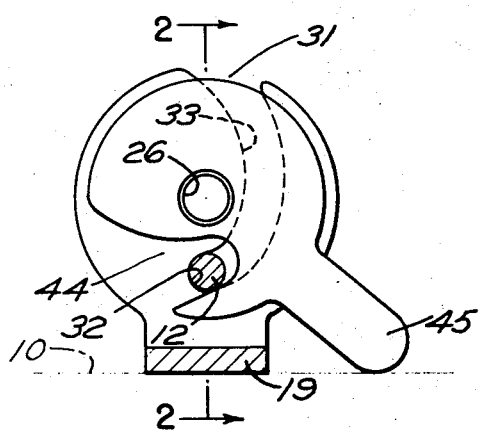
FIG. 5 is a further sectional view showing the keeper actuated to a full locking position.
Figure 4:
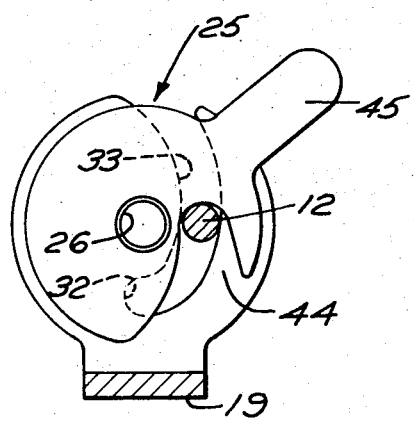
FIG. 4 is a similar view with the pin stem actuating the keeper to an intermediate position.

The rotary keeper 25 is provided with a slot 40, the edge 41 of which provides a cam surface while the opposite edge 42 presents a locking beak 43 for retaining the pin stem in position. A handle 45 may serve for manually rotating the keeper in its housing. As shown in FIG. 3, the relative position of the keeper and its housing is such that the open mouth 44 of the keeper is in registry with the open mouth 31 of the channel in the housing. When the pin stem 12 is moved into these mouths, it will engage the cam surface 41 of the keeper, and as pressure is applied on the pin stem, the cam surface will move the keeper 25 rotatably about its pivotal axis, from the position shown in FIG. 3 to the intermediate position shown in FIG. 4. Further pressure will cause the keeper to move rotatably to a position near the final position shown in FIG. 5 by action of the cam surface under action of the pin stem pressing thereagainst. However, it has been found that by having some slight play or looseness in the pivotal mounting, the rotative momentum of the keeper will be sufficient to continue rotation beyond the relative position where positive pressure is applied by the pin stem, to a final position with the handle 45 resting against the bar 10. In this position (FIG. 5) when the pin stem is in the clothing, the clothing will engage the handle 45 sufficiently so that the pin stem will not rotate the keeper back to discharge position. However, when discharge is desired, the handle 45 may be engaged and rotated to open the safety catch and the cam surface 41 will serve to eject the pin stem out from the channel of the fixed housing member 16.

I claim:

1. In a safety catch for use with a pin-like stem, a housing member having an arcuate channel therein opening in a mouth to its outer edge, a keeper member rotatably mounted in said housing member, said channel being located outside of and arcuate about the axis of rotation of said keeper member, said keeper member having a slot opening in a mouth to its outer edge also located outside and arcuate about said axis of rotation, said slot providing an edge of a cam like formation, said keeper member being rotatable to position its mouth in registry with the mouth of said housing member with its cam surface extending across said channel for the reception of a pin stem which when pressed against said cam surface will rotate the keeper member until the edge of the slot opposite from said cam surface closes said channel and said pin stem is disposed below said axis of rotation.

2. In a safety catch as in claim 1 wherein one edge of said arcuate channel extends from its entrance mouth in excess of 180° of arc of the pivotal axis of said keeper.

References Cited

UNITED STATES PATENTS

| | | | |
|---|---|---|---|
| 712,330 | 10/1902 | Pingel | 24—157P |
| 1,555,095 | 9/1925 | Ballou | 24—157P |
| 1,745,339 | 1/1930 | Folkman | 24—157P |

FOREIGN PATENTS

| | | | |
|---|---|---|---|
| 26,413 | 1902 | Great Britain | 24—157P |

DONALD A. GRIFFIN, Primary Examiner